United States Patent
Fan et al.

(10) Patent No.: US 7,650,195 B2
(45) Date of Patent: Jan. 19, 2010

(54) AUTOMATED TUNING OF LARGE-SCALE MULTIVARIABLE MODEL PREDICTIVE CONTROLLERS FOR SPATIALLY-DISTRIBUTED PROCESSES

(75) Inventors: Junqiang Fan, Vancouver (CA); Gregory E. Stewart, Vancouver (CA)

(73) Assignee: Honeywell ASCA Inc., Ontario (CA)

( * ) Notice: Subject to any disclaimer, the term of this patent is extended or adjusted under 35 U.S.C. 154(b) by 58 days.

(21) Appl. No.: 11/260,809

(22) Filed: Oct. 27, 2005

(65) Prior Publication Data

US 2007/0100476 A1   May 3, 2007

(51) Int. Cl.
*G05B 13/02* (2006.01)

(52) U.S. Cl. .............................. 700/31; 700/29; 700/30; 700/37; 702/150; 703/12

(58) Field of Classification Search .................. 700/31, 700/29, 30, 37; 702/150; 703/12
See application file for complete search history.

(56) References Cited

U.S. PATENT DOCUMENTS

| | | | |
|---|---|---|---|
| 5,121,332 A * | 6/1992 | Balakrishnan et al. | ...... 700/127 |
| 5,347,446 A | 9/1994 | Iino et al. | |
| 5,351,184 A | 9/1994 | Lu et al. | |
| 5,574,638 A | 11/1996 | Lu | |
| 5,893,055 A | 4/1999 | Chen | |
| 6,064,809 A | 5/2000 | Braatz et al. | |
| 6,086,237 A | 7/2000 | Gorinevsky et al. | |
| 6,253,113 B1 | 6/2001 | Lu | |
| 6,807,510 B1 | 10/2004 | Backstrom et al. | |
| 6,819,964 B2 | 11/2004 | Harmse | |
| 6,826,521 B1 | 11/2004 | Hess et al. | |

OTHER PUBLICATIONS

Shridhar and Cooper, "A Tuning strategy for unconstrained multivariable model predictive control," Industrial & Eng. Chem. & Research, vol. 37, No. 10, 4003-4016, 1998.
Dougherty & Cooper, "Tuning guidelines of a dynamic matrix controller for integrating (non-self-regulating) processes," Industrial & Eng. Chem. Res, v. 42, No. 8, 1739-52, 2003.

(Continued)

*Primary Examiner*—Albert DeCady
*Assistant Examiner*—Tejal Gami
(74) *Attorney, Agent, or Firm*—Cascio, Schmoyer & Zervas (57) ABSTRACT

An automated tuning method of a large-scale multivariable model predictive controller for multiple array papermaking machine cross-directional (CD) processes can significantly improve the performance of the controller over traditional controllers. Paper machine CD processes are large-scale spatially-distributed dynamical systems. Due to these systems' (almost) spatially invariant nature, the closed-loop transfer functions are approximated by transfer matrices with rectangular circulant matrix blocks, whose input and output singular vectors are the Fourier components of dimension equivalent to either number of actuators or number of measurements. This approximation enables the model predictive controller for these systems to be tuned by a numerical search over optimization weights in order to shape the closed-loop transfer functions in the two-dimensional frequency domain for performance and robustness. A novel scaling method is used for scaling the inputs and outputs of the multivariable system in the spatial frequency domain.

18 Claims, 7 Drawing Sheets

OTHER PUBLICATIONS

Rani & Unbehauen, "Study of predictive controller tuning methods," Automatica, vol. 33, No. 12, 2243-2248, 1997.

Al-Ghazzawi et al.,"On-line tuning strategy for model predictive controllers," J. of Process Control, vol. 11, No. 3, 265-284, 2001.

Trierweiler & Farina,"RPN tuning strategy for model predictive control," J. of Process Control, vol. 13, No. 7, 591-598, 2003.

Fan, "Model predictive control for multiple cross-directional processes: Analysis, tuning, and implementation," Ph.D. dissertation, Univ. British Columbia, Vancouver, CA 2003.

Fan et al., "Two-dimensional frequency analysis for uncontrained model predictive control of cross-directional process," Automatica, vol. 40, No. 11, 1891-1903, 2004.

Hovd & Skogestad, "Control of symmetrically interconnected plants," Automatica, vol. 30, No. 6, 957-973, 1994.

Fan et al.,"Two-dimensional frequency response analysis and insights for weight selection in cross-directional MPC," Proceedings of 42th IEE conference, Maui Hawaii 2003.

Dimitry M. Gorinevsky, Identification Tool for Cross-Directional Processes, IEEE Transactions on Control Systems, vol. 11, No. 5, Sep. 2003, pp. 629-640.

* cited by examiner

$$\tilde{G}_{ij}(z) = \begin{bmatrix} g_{ij}(v_0, z) & & & & 0 & & 0 & \\ & g_{ij}(v_1, z) & & & & 0 & & \ddots \\ & & \ddots & & & & \ddots & \\ & & & g_{ij}(v_p, z) & & & & 0 \\ \hline 0 & & & & 0 & & 0 & \\ & 0 & & & & \ddots & & \\ & & \ddots & & & & & 0 \\ 0 & & & 0 & \tilde{g}_{ij}(v_q, z) & & & \\ & & \ddots & & & \tilde{g}_{ij}(v_{q-1}, z) & \ddots & \\ & & & 0 & & & & \tilde{g}_{ij}(v_1, z) \end{bmatrix}$$

FIG. 4

$$\hat{G}(z) = \left.\begin{bmatrix} g(v_0, z) & & & & & \\ & g(v_1, z) & & & & \\ & & \tilde{g}(v_1, z) & & & \\ & & & \ddots & & \\ & & & & g(v_k, z) & \\ & & & & & \tilde{g}(v_k, z) \\ \hline 0 & & & & & \cdots & 0 \\ \vdots & & & \cdots & & \vdots \\ 0 & & & & & \cdots & 0 \end{bmatrix}\right\} \hat{G}_1(z)$$

AUTOMATED TUNING OF LARGE-SCALE MULTIVARIABLE MODEL PREDICTIVE CONTROLLERS FOR SPATIALLY-DISTRIBUTED PROCESSES

FIELD OF THE INVENTION

The present invention generally relates to techniques for monitoring and controlling continuous sheetmaking systems and more, specifically to techniques for automatically tuning large-scale multivariable model predictive controllers for spatially-distributed processes such as paper machine cross-directional processes.

BACKGROUND OF THE INVENTION

In the art of making paper with modern high-speed machines, sheet properties must be continually monitored and controlled to assure sheet quality and to minimize the amount of finished product that is rejected when there is an upset in the manufacturing process. The sheet variables that are most often measured include basis weight, moisture content, and caliper (i.e., thickness) of the sheets at various stages in the manufacturing process. These process variables are typically controlled by, for example, adjusting the feedstock supply rate at the beginning of the process, regulating the amount of steam applied to the paper near the middle of the process, or varying the nip pressure between calendaring rollers at the end of the process.

A paper machine employs large arrays of actuators spread across a continuously moving web to control the cross-directional (CD) profiles of paper properties as measured by one (or several) scanning sensor(s) downstream from the actuators. Typically, designers are using pairing rules to choose one CD actuator array for controlling one paper sheet property and the interaction of multiple array CD processes is usually neglected in traditional CD control.

Most well-designed single array CD systems are unfortunately ill-conditioned. Even at steady-state, some of their singular values are vanishingly small. The large dimensionality and the ill-conditioning make these processes challenging to control. It has been recently suggested that for multiple array CD processes the ill-conditioning of the process could be due to the interaction between multiple array measurements and actuators. That means it can be more difficult to control multiple array CD systems than single array CD systems.

Application of model predictive control (MPC) in CD processes has been considered for some time. Although most published papers consider only one actuator array and one controlled property and consequently do not address the problem of coordinating multiple CD actuator arrays controlling multiple sheet properties, multiple array CD control systems are becoming more prevalent. Industrial model predictive control implementation can employ a multiple-array model of the CD process that is obtained from a complementary industrial model identification tool. The advantages of multiple-array control are evident in the improved performances that have been reported. The main disadvantage of online optimization is the enormous computational load required as the constrained quadratic programming (QP) problem may be required to generate as many as 600 actuator setpoints subject to up to 1800 constraints from up to 6000 measurements as often as every 15 seconds. The optimization problem is highly structured and optimization algorithms which exploit this structure have been developed. A potentially complementary technique is to use model reduction techniques to reduce the size of the optimization problem.

In R. Shridhar and D. J. Cooper, "A tuning strategy for unconstrained multivariable model predictive control," *Industrial & Engineering Chemistry & Research*, vol. 37, no. 10, pp 4003-4016, 1998 and D. Dougherty and D. J. Cooper, "Tuning guidelines of a dynamic matrix controller for integrating (non-self-regulating) processes," *Industrial & Engineering Chemistry & Research*, vol. 42, no. 8, pp 1739-1752, 2003, the authors proposed some tuning guidelines for multivariable dynamic matrix controllers. In K. Y. Rani and H. Unbehauen, "Study of predictive controller tuning methods," *Automatica*, vol. 33, no 12, pp 2243-2248, 1997, the authors proposed tuning procedures for predictive controllers that are based on some tuning rules and closed-loop simulations. In J. H. Lee and Z. Yu, "Tuning of model predictive controllers for robust performance," *Computers & Chemical Engineering*, vol. 18, no. 1, pp. 15-37, 1994, tuning rules based on the frequency-domain analysis of the closed-loop behavior of MPC controllers are presented. In A. Al-Ghazzawi, et al., "On-line tuning strategy for model predictive controllers," *Journal of Process Control*, vol. 11, no. 3, pp. 265-284, 2001, an on-line tuning strategy for linear model predictive control algorithms is proposed based on the linear approximation between the closed-loop predicted output and the MPC tuning parameters. J. Trierweiler and L. A. Farina, "RPN tuning strategy for model predictive control," *Journal of Process Control*, vol. 13, no. 7, pp. 591-598, 2003, presented a tuning strategy based on robust performance number for multiple-input multiple-output (MIMO) MPC. However, the above tuning strategies may be not directly used for tuning the large-scale two-dimensional industrial CD MPC, especially in the spatial domain.

Figure 1:
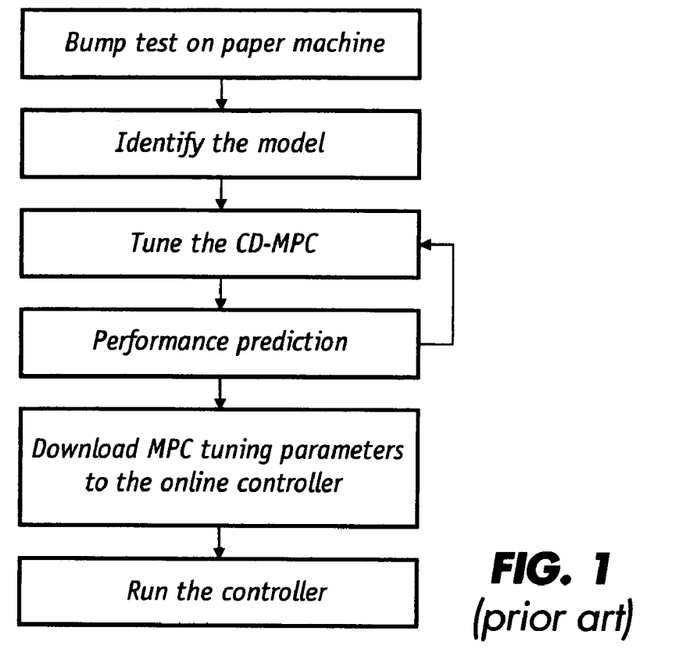
FIG. 1 is a procedure for implementation of an industrial paper machine CD control.

The procedure for implementing a paper machine CD MPC control system is shown in FIG. 1. The third step where prediction horizons and optimization weights are selected is often ad hoc and typically evaluated via simulations of the closed-loop system. The state of the art is trial and error which quickly becomes overwhelming for large-scale MPC problems. A one-step static optimizer has been proposed to greatly reduce the computation time while accurately predicting the steady-state performance. For CD process, it has been shown that is possible to separately tune the CD controller in the spatial and temporal domain. However, even with the static optimizer, tuning the multivariable CD predictive controller through trial and error is very difficult even for experienced engineers as there are so many (typically more than 10) tuning parameters. Another practical issue is that there is no indication whether the controller is robustly stable for inevitable model uncertainties.

SUMMARY OF THE INVENTION

The present invention is directed to a novel automatic tuning method for large-scale multivariable MPCs. The method is particularly suited for application to the spatially-distributed multiple CD array process in a paper machine or an off-machine supercalender.

Single array CD processes can be approximated by rectangular circulant matrices and then transformed into the spatial and temporal frequency domain. The present invention is based, in part, on the recognition that multiple CD array processes can be approximated by rectangular circulant matrix blocks. After proper transformation and permutation, the huge dimensional plant model can be decoupled into a family of small MIMO systems across the spatial frequencies. The tuning will be done in the two-dimensional frequency domain. Scaling of the process model assures that the tuning parameters do not change with the physical unit changes of the measurement and the actuation. The automatically tuned multiple array CD processes provide the desired closed-loop behavior in the two-dimensional frequency domain.

In one embodiment, the invention is directed to a method of automatically tuning a multivariable model predictive controller (MPC) for a spatially-distributed process that includes the steps of:
  (a) identifying a process model for the spatially-distributed process;
  (b) scaling inputs and outputs of the process model;
  (c) transforming the process model into a two-dimensional frequency domain;
  (d) transforming the MPC into a two-dimensional frequency domain;
  (e) determining an optimal solution of the spatial tuning parameters with respect to model uncertainty; and
  (f) determining an optimal solution of the temporal tuning parameters with respect to model uncertainty.

Each of steps (e) and (f) can employ (i) an unstructured model uncertainty, e.g., multiplicative input uncertainty, multiplicative output uncertainty, inverse additive model uncertainty, inverse multiplicative input uncertainty, inverse multiplicative output uncertainty, or (ii) structured model uncertainty to satisfy the robust stability condition.

In another embodiment, the invention is directed to a process control system having a multivariable model predictive controller (MPC) for providing control to a multiple-array cross-directional (CD) process having at least one manipulated actuator array and at least one controlled measurement array, a method for providing control of a process that includes the steps of:
  (a) automatically tuning the MPC by the steps of:
    (i) identifying a process model for the CD process;
    (ii) scaling inputs and outputs of the process model;
    (iii) transforming the process model into the two-dimensional frequency domain;
    (iv) transforming the MPC into the two-dimensional frequency domain;
    (v) calculating possible ranges of spatial and temporal tuning parameters for the MPC;
    (vi) determining an optimal solution of spatial tuning parameters with respect to model uncertainty; and
    (vii) determining an optimal solution of temporal tuning parameters with respect to model uncertainty;
  (b) inputting optimal tuning parameters to the MPC; and
  (c) controlling the multiple-array CD process with the MPC.

In a further embodiment, the invention is directed to a system which forms a material in a multivariable-array cross-directional process wherein the system includes:
  at least two sets of actuator arrays each distributed adjacent the material in the cross direction (CD), wherein each set of actuator arrays is controllable to vary the properties of the material;
  means for measuring and acquiring properties data about the properties of the material in the cross direction; and
  a multivariable model predictive controller (MPC) for providing CD control to the multiple-array cross-directional process, wherein the MPC includes means for automatically tuning the MPC, wherein the MPC, in response to signals that are indicative of the properties data, provides signals to the at least two sets of actuator arrays to vary properties of the material.

BRIEF DESCRIPTION OF THE DRAWINGS

FIG. 11 (a)-(c) are graphs of 2-sigma trend plots of measurement profiles by using different control strategies.

DETAILED DESCRIPTION OF PREFERRED EMBODIMENTS

The inventive automatic tuning method will be illustrated by implementing the technique in a large-scale multivariable MPC that controls the supercalendering process of a paper machine. Supercalendering is a common process in the paper industry. A supercalendering process is either an on-machine continuous process or an off-machine batch process. It is used to improve the paper sheet's surface properties, such as smoothness and gloss (shininess), which are critical for high-quality printing paper. The paper could be uncoated, one-side coated, or two-side coated.

It is understood that the inventive technique is sufficiently flexible as to be applicable to any large-scale industrial multivariable cross-directional (CD) process that is controlled by a multivariable MPC. For instance, besides the off-machine and on-machine supercalendering processes, other paper machine processes can also be controlled by a multivariable MPC. Suitable paper machine processes where paper is continuously manufactured from wet stock are further described, for instance, in U.S. Pat. No. 6,805,899 to MacHattie et al., U.S. Pat. No. 6,466,839 to Heaven et al., U.S. Pat. No. 6,149,770, to Hu et al., U.S. Pat. No. 6,092,003 to Hagart-Alexander et al, U.S. Pat. No. 6,080,278 to Heaven et al., U.S. Pat. No. 6,059,931 to Hu et al., U.S. Pat. No. 6,853,543 to Hu et al., and U.S. Pat. No. 5,892,679 to He, which are all assigned to Honeywell International, Inc. and are incorporated herein by reference. The inventive technique can also be applied to plastic sheetmaking, rubber sheetmaking, and sheet metal operations.

Multiple CD Array Process Model of a Supercalender

Figure 2:
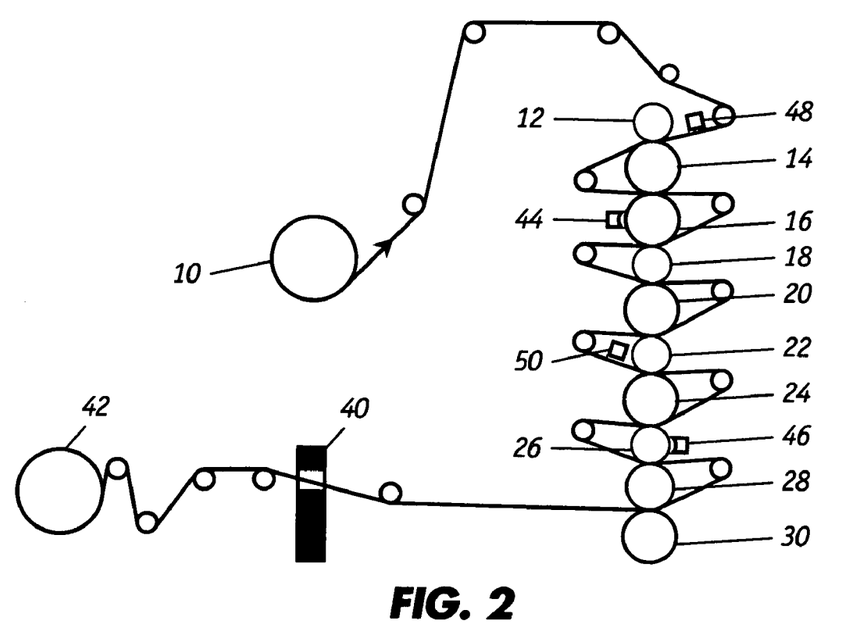
FIG. 2 is an off-machine supercalender process used in a paper mill.

FIG. 2 depicts an off-machine supercalender process that is employed in a paper mill. The supercalender CD process is used as a typical multiple CD array process model to illustrate the invention. That is, like other paper machine CD processes, the supercalendering process is a two-dimensional (spatial and temporal) process. The process starts with unwinding the paper sheet from the reel at an unwinder 10. The paper sheet is then fed between a series of rolls 12, 14, 16, 18, 20, 22, 24, 26, 28, and 30 that are arranged vertically. The point between two rolls through which the paper sheet passes is called the nip. The rolls are arranged to alternate hard and soft with two consecutive soft rolls 18, 20 in the middle of the stack. The nip containing two consecutive soft rolls is called as the reversing nip. It is at this point where the work being done by the hard rolls is transferred from one side of the sheet to the other. The paper sheet passes out from the bottom of the stack, through the scanner 40 which measures sheet properties and is then wound up on the reel at the rewind stand 42. On-line scanning sensors for papermaking manufacture are disclosed in U.S. Pat. No. 4,879,471 to Dahlquist, U.S. Pat. No. 5,094,535 to Dahlquist et al., and U.S. Pat. No. 5,166,748 to Dahlquist, all of which are assigned to Honeywell International, Inc. and incorporated herein by reference. Alternatively, for CD measurements, an array of sensors can be positioned along the CD at any suitable position adjacent the moving sheet of paper.

Rolls 16 and 22 are heated with hot water. The process is also equipped with two steam box actuator arrays 48 and 50 and two induction heating actuator arrays 44 and 46. For the two steam box actuator arrays, the top side one is designated $u_1$ and the wire side one $u_4$. For the two induction heating actuator arrays, the topside one is designated $u_2$ and wire side one $u_3$. Each steam box actuator array has $n_1 = n_4 = 31$ actuators and each induction heating actuator array has $n_2 = n_3 = 64$ actuators. The controlled sheet properties are top side gloss (smoothness) is designated $y_1$, caliper (thickness) $y_2$, and wire side gloss $y_3$. The number of measurement arrays is m=192 after signal processing of the scanner's sensors. While this illustrative supercalender has 4 actuator arrays and 3 measurements of dimension 192, the inventive tuning method is applicable to supercalenders with other instrumentation configurations, and, indeed, the method is applicable to other multivariable CD processes in general.

The multiple CD array system process model is given by, $$Y(z) = G(z)U(z) + D(z), \quad (1)$$

$$G(z) = \begin{bmatrix} G_{11}(z) & G_{12}(z) & 0 & 0 \\ G_{21}(z) & G_{22}(z) & G_{23}(z) & G_{24}(z) \\ 0 & 0 & G_{33}(z) & G_{34}(z) \end{bmatrix}, \quad (2)$$

$$G_{ij}(z) = P_{ij} h_{ij}(z), \quad (3)$$

Where
$Y(z) = [y_1(z), \ y_2(z), \ y_3(z)]^T \in C^{576 \times 1}, \ y_i(z) \in C^{192 \times 1},$
$U(z) = [u_1(z), \ u_2(z), \ u_3(z), \ u_4(z),]^T \in C^{190 \times 1},$
$u_j(z) \in C^{n_j \times 1}, \ j = 1, 2, 3, 4,$
$D(z) = [d_1(z), \ d_2(z), \ d_3(z)]^T \in C^{576 \times 1}, \ d_i(z) \in C^{192 \times 1},$ $$h_{ij}(z) = \frac{(1 - a_{ij})z^{-T_{dij}}}{1 - a_{ij}z^{-1}},$$

where $Y(z)$, $U(z)$, and $D(z)$ are the z-transforms of the measurement profiles, the actuator profiles, and the disturbance profiles respectively; $P_{ij}$ is the (i,j)$^{th}$ interaction matrix which describes the spatial response of the (i,j)$^{th}$ process; $h_{ij}(z)$ is the z-transform of the temporal response of the (i,j)$^{th}$ process, the integer $T_{dij}$ represents the (i,j)$^{th}$ process dead time, and $a_{ij}$ is related to the (i,j)$^{th}$ process time constant and the sampling time. The spatial interaction matrices $P_{ij}$ and the temporal response $h_{ij}(z)$ are identified from input-output data by a standard industrial software tool, which is described, for example, in D. M. Gorinevsky and C. Gheorghe, "Identification tool for cross-directional processes," *IEEE Transactions on Control Systems Technology*, vol. 11, no. 5, pp 629-640, Sep. 2003. Each actuator within an array is considered to have the same spatial response shape. Further, the spatial interaction matrices $P_{ij}$ are approximated as rectangular circulant matrices (RCMs). The concept of RCMs and their properties are further described in J. Fan et al., "Two-dimensional frequency analysis for unconstrained model predictive control of cross-directional processes," *Automatica*, vol. 40, no. 11, pp. 1891-1903, 2004. In practice, this approximation is typically minor.

In general, in order to properly tune the CD MPC control system, it is necessary to require that the tuning parameters not change with the physical unit changes of the measurement and the actuation. It is also required that the tuning parameters not change with the resolution changes of the measurements and the actuation. By the resolution changes of the measurements and the actuation is meant that only the dimensions of the input and output are increased/decreased whereas the spatial response shape is not changed (that is, the dimension of the column vectors of $P_{ij}$ and the number of column vectors of $P_{ij}$ are increased/decreased but their shapes are not changed.) In order to complete such tasks, it is necessary that the process model G(z) in (1) be scaled. After proper preprocessing, scaling can be accomplished by standard techniques which are described in, for example, U.S. Pat. No. 5,574,638 to Lu and assigned to Honeywell International, Inc, which is incorporated herein by reference. The following sets forth novel scaling functions for the multiple CD process model G(z).

Scaling

The multiple cross-directional process model G(z) can be transformed into a series of small matrix models which are sorted according to the spatial frequencies as shown in the following "Temporal and Spatial Frequencies" section. At steady-state (z=1), these models are $$g(v_k, 1) = \begin{bmatrix} g_{11}(v_k, 1) & g_{12}(v_k, 1) & 0 & 0 \\ g_{21}(v_k, 1) & g_{22}(v_k, 1) & g_{23}(v_k, 1) & g_{24}(v_k, 1) \\ 0 & 0 & g_{33}(v_k, 1) & g_{34}(v_k, 1) \end{bmatrix}, \quad (4)$$

where $v_k$ is the $k^{th}$ spatial frequency with k=0, 1, ..., p, $v_p$ is the smallest "cut-off" frequency of all subplants (excluding those zero-interaction subplants). The "cut-off" frequency of one subplant $v_c$ may be defined as $$|\tilde{f}(v)| \leq \xi \cdot \max(|\tilde{f}(v)|) \text{ for } v \geq v_c, \quad (5)$$

where $\xi = 0.1 \sim 0.5$, $\tilde{f}$ denotes the spatial frequency components of $P_{ij}$ in (3).

Here the average model of all "controllable" frequency models $g(v_k, 1)$ in (4) is used to represent the unscaled model, $$\bar{g} = \begin{bmatrix} \bar{g}_{11} & \bar{g}_{12} & 0 & 0 \\ \bar{g}_{21} & \bar{g}_{22} & \bar{g}_{23} & \bar{g}_{24} \\ 0 & 0 & \bar{g}_{33} & \bar{g}_{34} \end{bmatrix}, \quad (6)$$

where $$\bar{g}_{ij} = \frac{\sum_{k=0}^{p} g_{ij}(v_k, 1)}{p+1},$$

with i=1, 2, 3, j=1, 2, 3, 4, p is from the above smallest "cut-off" frequency of all subplants $v_p$.

Let the scaling functions be diagonal matrices $d_y \in R^{3\times 3}$ and $d_u \in R^{4\times 4}$, then the scaled average model $\bar{g}_s \in R^{3\times 4}$ in the "controllable" frequency range is defined by $$\bar{g}_s = d_y \cdot \bar{g} \cdot d_u^{-1}. \quad (7)$$

$d_y$ and $d_u$ is used to minimize the condition number of $\bar{g}$ and can be solved by the iteration method described in U.S. Pat. No. 5,574,638.

The scaling functions for the inputs U(z) and the outputs Y(z) in (1) are $$D_y = \text{diag}(d_y(1)I_m, d_y(2)I_m, d_y(3)I_m), \quad (8)$$

$$D_u = \text{diag}(d_u(1)I_{n_1}, d_u(2)I_{n_2}, d_u(3)I_{n_3}, d_u(4)I_{n_4}), \quad (9)$$

where the operator "diag" denotes to generate a diagonal matrix and $I_x$ means a x-by-x identity matrix. Therefore, the scaled inputs, outputs, and multiple CD process model can be calculated by $$U_s(z) = D_u U(z), \quad (10)$$

$$Y_s(z) = D_y Y(z), \quad (11)$$

$$G_s(z) = D_y G(z) D_u^{-1}. \quad (12)$$

In order to simplify the notation, from now on, the model G(z) is considered as the scaled model which is not affected by physical units of the inputs and outputs.

It has also been assumed that the true process response belongs to a set of possible response models, which is described by $$G_P(z) \in \Pi := \{G(z) + \Delta(z) : \bar{\sigma}(\Delta(e^{i\omega})) < \alpha \|G(z)\|_\infty\}, \quad (13)$$

where $\alpha \in (0, 1)$ is a positive scalar number which limits the perturbed transfer matrix $G_p(z)$ to a neighborhood of the nominal model G(z) in (1), $\Delta(z)$ is the unstructured additive model uncertainty, $\bar{\sigma}$ denotes the maximum singular value, $z = e^{i\omega}$ and the symbol $\omega$ denotes the temporal frequency.

Industrial CD Model Predictive Controller

The inventive method can automatically tune any suitable large-scale multivariable model predictive controller used in spatially-distributed processes. In this example, the method was employed in a recently developed industrial MPC controller for CD processes that is described in U.S. Pat. No. 6,807,510 to Backstrom and He and assigned to Honeywell ASCa Inc, which is incorporated herein by reference. For this industrial MPC, the quadratic programming problem is as follows, $$\min_{\Delta U(k)} \sum_{i=1}^{H_p} E(k+i)^T Q_1 E(k+i) + \quad (14)$$

$$\{\Delta U(k)^T Q_2 \Delta U(k) + (U(k) - U_t)^T Q_3 (U(k) - U_t) + U(k)^T Q_4 U(k)\}$$

subject to (1) and the following constraints on actuator arrays:

$$\Omega \Delta U(k) \leq b - \phi U(k-1) \quad (15)$$

where $E(k) = \hat{Y}(k) - Y_{sp}(k)$, $\hat{Y}$ are the predicted output profiles, $Y_{sp}$ are the setpoints for controlled sheet property, $H_p$ is the prediction horizon, and the control horizon is chosen as 1 due to relatively simple dynamics and computation consideration, the changes in the actuator array $\Delta U(k)(=U(k)-U(k-1))$, and $U_t$ are the target positions for the actuator profiles, and the weights $$Q_1 = \text{diag}(q_{11}I_m, q_{12}I_m, q_{13}I_m), \quad (16)$$

$$Q_j = \text{diag}(q_{j1}I_{n_1}, \cdots, q_{j4}I_{n_4}), \; j = 2, 3, \quad (17)$$

$$Q_4 = \text{diag}(q_{41}B_{n_1}^T B_{n_1}, \cdots, q_{44}B_{n_4}^T B_{n_4}), \quad (18)$$

$$B_{n_j} = \begin{bmatrix} -1 & 1 & 0 & \cdots & \cdots & \cdots & 0 \\ 1 & -2 & 1 & \ddots & \ddots & \ddots & \vdots \\ 0 & 1 & -2 & \ddots & \ddots & \ddots & \vdots \\ \vdots & \ddots & \ddots & \ddots & \ddots & \ddots & \vdots \\ \vdots & \ddots & \ddots & \ddots & -2 & 1 & 0 \\ \vdots & \ddots & \ddots & \ddots & 1 & -2 & 1 \\ 0 & \cdots & \cdots & \cdots & 0 & 1 & -1 \end{bmatrix}, \quad (19)$$

where $\text{diag}(x_1, \ldots, x_n)$ means that a (block) diagonal matrix has (block) diagonal elements $x_1, \ldots, x_n$, $I_x$ denotes a x-by-x identity matrix, $B_{n_j} \in R^{n \times n_j}$ is known as the "bending moment matrix"; $q_{li}$ with i=1 to 3, $q_{jk}$ with j=2, 3, 4 and k=1 to 4 are positive scalar numbers, which need to be tuned, $\Omega$, $\phi$, and b in (15) are constraint matrices and vector respectively derived from consideration of the physical limitations on the actuators or sometimes from thermal considerations of the process.

Closed-Loop Transfer Functions

Strictly speaking, the model predictive controller in (14)-(15) is a time varying nonlinear controller. It is very difficult to directly analyze the closed-loop system's properties. Therefore, in this example, the strategy is to first ignore the constraints (15), then compute the closed-loop transfer matrices and analyze the performance and robustness of the system based on these matrices, and finally re-introduce the constraints (15) for implementation. While such a technique does not guarantee performance when the constraints are reintroduced, it will provide acceptable performance for the commonly seen case where none of the constraints is active. In this way it provides an advantage over the current trial and error plus closed-loop simulation method. The goal is to design weights $Q_1$ to $Q_4$ such that the closed-loop transfer functions for the unconstrained case have desirable properties in the two-dimensional frequency domain.

Figure 3:
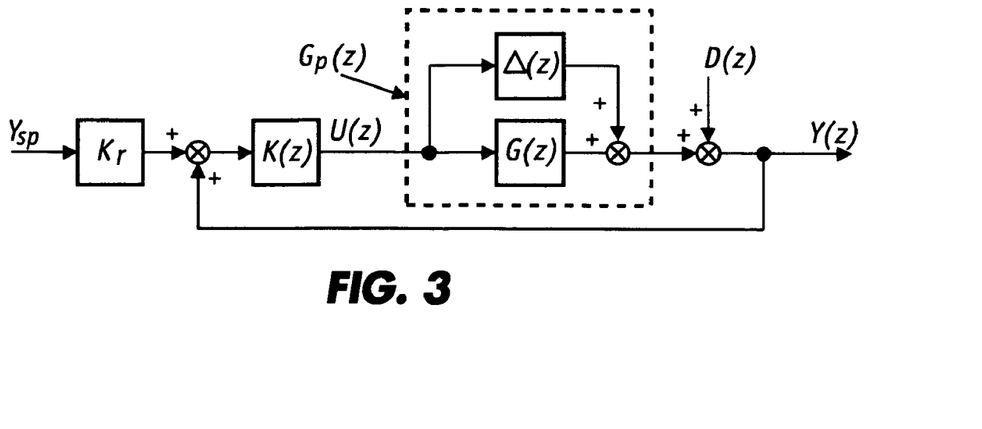
FIG. 3 is a closed-loop system block diagram with the unconstrained MPC in equation 14.

FIG. 3 illustrates the block diagram structure for a closed-loop system with an unconstrained MPC. The derivation of the constant prefilter matrix $K_r \in R^{576 \times 576}$ and the complex transfer matrix $K(z) \in C^{190 \times 576}$ from (1)-(3) and (14) is standard.

The linear closed-loop system in FIG. 3 is robustly stable for all plants $G_p(z)$ in (13) if it is nominally stable and $$\|R(z)\Delta(z)\|_\infty < 1 \Leftarrow \bar{\sigma}(R(e^{i\omega})) < \frac{1}{\bar{\sigma}(\Delta(e^{i\omega}))}, \; \forall \omega, \quad (20)$$

$$R(z) = K(z) \cdot [I - G(z)K(z)]^{-1}, \quad (21)$$

where $\Delta(z)$ is the unstructured uncertainty in (13) and the result (20) follows from the small gain theorem, $R(z) \in C^{190 \times 576}$ (also called as control sensitivity function) is the nominal closed-loop transfer matrix connecting the actuator setpoints $U(z)$ to the output disturbance $D(z)$.

The CD control performance criterion may be defined by the nominal transfer matrix linking the measured profile $Y(z)$ with the output disturbances $D(z)$ from FIG. 3 as, $$S(z)=[I-G(z)K(z)]^{-1}, \quad (22)$$

where $S(z) \in C^{576 \times 576}$ is also known as the sensitivity function.

The design degrees of freedom available in the industrial model predictive controller (14) are the weighting matrices $Q_1$ to $Q_4$ and the prediction horizon $H_p$. These parameters should be automatically tuned such that:

(i) the closed-loop control system given by (14) and (1) is stable for all $G_p(Z) \in \Pi$ in (13);

(ii) the 2-norm of the error profile $E(k)$ in (14) at steady-state is kept as small as possible; and (iii) desirable closed-loop properties in the two-dimensional frequency domain.

Temporal and Spatial Frequencies

This section summarizes some of the work presented about rectangular circulant matrices (RCMs) and rectangular circulant block matrices.

Figure 4:
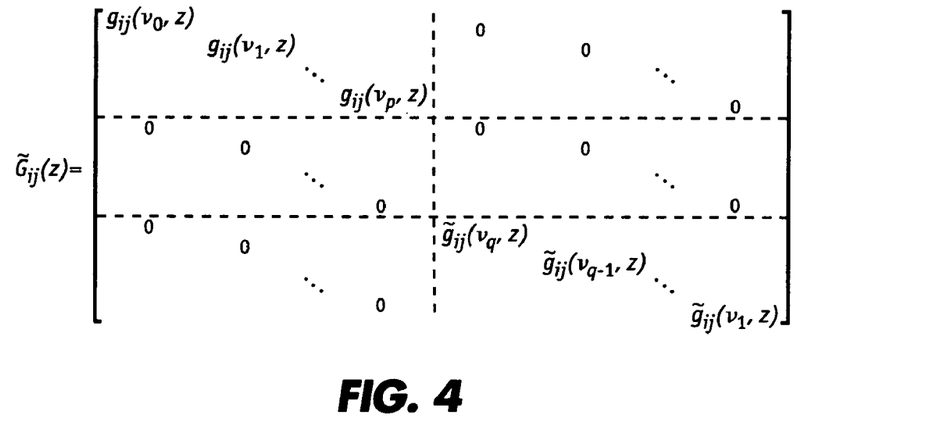
FIG. 4 is the diagonal property of the subplant model $\tilde{G}_{ij}(z)$ in the spatial frequency domain.

It is known that these single CD arrays systems $G_{ij}(z)$ are spatial frequency bandlimited. Therefore, $G_{ij}(z)$ in (2) are approximated as spatial frequency bandlimited RCMs. Let $G(z)(=F_m G_{ij}(z)F_{n_j}^H)$ represent the model in the spatial frequency domain, where $F_m \in C^{192 \times 192}$ and $F_{n_j} \in C^{n_j \times n_j}$ are the complex Fourier matrices and H means the conjugate transpose. Note that $\hat{G}_{ij} \in C^{192 \times n_j}$ has the diagonal nonzero elements as illustrated in FIG. 4, which represent spatial frequency gains, due to its RCM characteristic. In FIG. 4, $g_{ij}(v_0,z)$ is the gain at zero spatial frequency $v_0$, $g_{ij}(v_k,z)$ and $\tilde{g}_{ij}(v_k,z)$ are conjugate and represent the same spatial frequency gain with different phases, $p=q-1=n_j/2-1$ for even $n_j$, and $p=q-1=(n_j-1)/2$ for odd $n_j$.

The multiple array CD process model in the two-dimensional frequency domain can be obtained through $$\hat{G}(z)=P_y F_y G(z) F_u^H P_u^T, \quad (23)$$

where $P_y \in R^{576 \times 576}$ and $P_u \in R^{190 \times 190}$ are (unitary) permutation matrices, and $F_y$ and $F_u$ are $$F_y = \text{diag}(F_m, F_m, F_m), F_u = \text{diag}(F_{n_1}, F_{n_2}, F_{n_3}, F_{n_4}).$$

Figure 5:
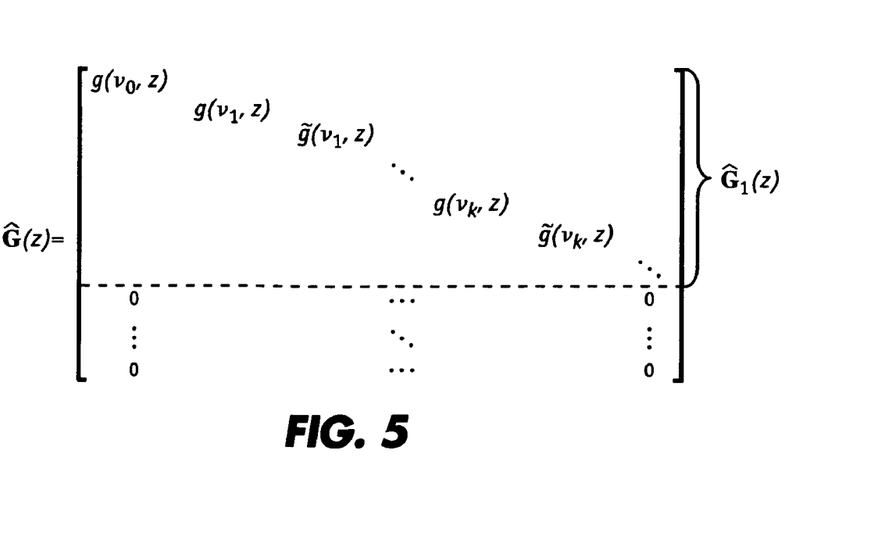
FIG. 5 is the block diagonal property of $\hat{G}(z)$ in equation 23.

The matrix $\hat{G}(z)$ as illustrated in FIG. 5, where $g(v_k,z)$ are obtained through $$g(v_k, z) = \begin{bmatrix} g_{11}(v_k, z) & g_{12}(v_k, z) & 0 & 0 \\ g_{21}(v_k, z) & g_{22}(v_k, z) & g_{23}(v_k, z) & g_{24}(v_k, z) \\ 0 & 0 & g_{33}(v_k, z) & g_{34}(v_k, z) \end{bmatrix},$$

The singular values of $\hat{G}(z)$ can be obtained through solving the singular values of the small dimension matrices $g(v_0,z)$, $g(v_k,z)$ and $\tilde{g}(v_k,z)$ which are sorted through spatial frequencies from low to high. Finally we can obtain the singular values of $G(z)$ in (2) according to spatial frequencies.

For multiple array systems, if the nominal plant $G(z)$ in (2) is an RCM-blocks matrix and its subplants $G_{ij}(z)$ are spatial bandlimited, then the unconstrained MPC controller $K(z)$ in FIG. 3, the sensitivity function $S(z)$ in (22), and the transfer matrix $R(z)$ in (21) also have an spatial bandlimited RCM-blocks structure. This allows analysis of the closed-loop transfer functions to proceed in the two-dimensional frequency domain.

Automatic Tuning

From (14), the tuning parameters are the prediction horizon $H_p$ and the weights $Q_1$ to $Q_4$. Typically the design of the prediction horizon $H_p$ in (14) is based on the dynamics of the process and is chosen as the sum of the maximum time delay $T_{dij}$ and 3 times of the maximum time constant of the subplants.

The number of degrees of freedom in the selection of tuning parameters in (14) can be reduced by noting that without loss of generality, $Q_1$ in (14) may be fixed and the closed-loop performance modified via $Q_2$, $Q_3$ and $Q_4$. Typically in CD MPC, the weighting matrix $Q_2$ is considered to affect the dynamics of the closed-loop system while $Q_3$ affects the slower behavior and steady-state performance and $Q_4$ affects the high spatial frequency behavior.

From Theorem 3 in J. Fan et al., "Two-dimensional frequency analysis for unconstrained model predictive control of cross-directional processes," *Automatica*, vol. 40, no. 11, pp. 1891-1903, 2004, it is known that the sensitivity function $S(z)$ in (22) in the two-dimensional frequency domain does not depend on $Q_2$ at steady-state ($z=1$) and does not depend on $Q_4$ at the spatial frequency $v=0$. This means that it is possible to tune the closed-loop control system separately, first for spatial tuning in the spatial frequency domain at steady-state, and then temporal tuning in the temporal frequency domain at the spatial frequency $v=0$. The tuning strategy is summarized in FIG. 6a. The tuning goal is to let the controller be as aggressive as possible while still respecting the robust stability condition in (20), that is, let $q_{2j}$, $q_{3j}$, $q_{4j}$ with $j=1$ to 4 in (17),(18) be as small as possible.

In this design, it has been assumed that users will provide the relative importance of the controlled properties and the relative aggressiveness of the manipulated actuator arrays based on the product's requirements and actuator's physical considerations. For default, each controlled property is considered as equally important and each actuator array works equally aggressively. Let $q_{t1,i}$ and $q_{tk,j}$ with $k=2, 3, 4$, denote the $i^{th}$ measurement's relative importance parameter, and the $j^{th}$ actuator array's relative aggressiveness parameters, respectively. The default values for these parameters are ones.

Figure 6A:
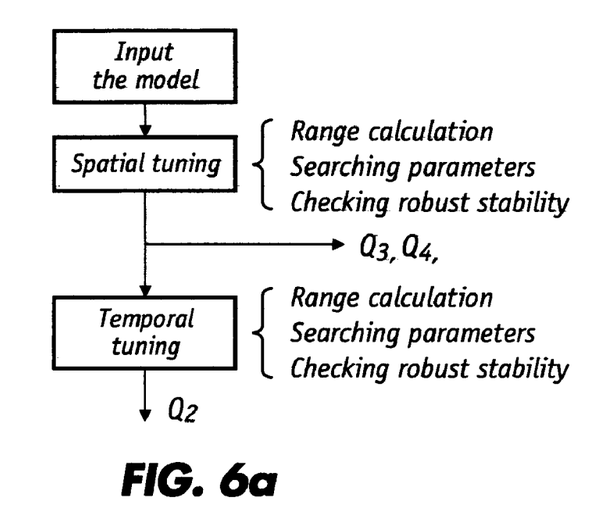
FIG. 6a is a tuning procedure of a CD MPC.
Figure 6B:
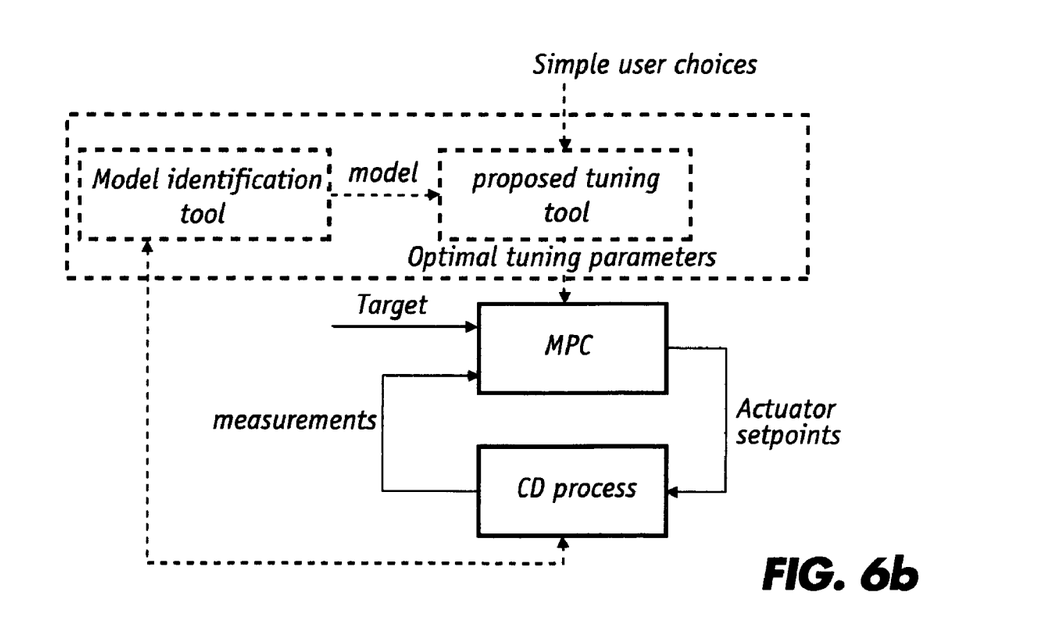
FIG. 6b is the automatic tuning procedure of the CD MPC system.

The tuning strategy as shown in FIG. 6a can be employed in the automatic tuning method of the CD MPC system as shown in FIG. 6b where preferred techniques for implementing the model identification tool to identify the process model are to perform standard bump tests and model identification steps that are described, for example, in U.S. Pat. No. 6,086,237 to Gorinevsky and Heaven and assigned to Honeywell International, Inc, which is incorporated herein by reference. Using the process model, easily adjustable tuning parameters can be automatically searched within possible pre-calculated ranges. The tuning parameters that are determined are then loaded to the MPC that controls the CD process, e.g., super-calender. The inventive method assures that the controller is optimal and robust, that is, the control system can operate consistently under a variety of operating conditions.

Spatial Tuning

In order to simplify the automatic tuning process, a global spatial ratio parameter $\rho$ for spatial tuning parameters $Q_3$ and $Q_4$ was used. That is, $$Q_3 = \rho \cdot \text{diag}(q_{t31}I_{n_1}, \ldots, q_{t34}I_{n_4}), \quad (24)$$

$$Q_4 = \rho \cdot \text{diag}(q_{t41}I_{n_1}, \ldots, q_{t44}I_{n_4}). \quad (25)$$

From the previous discussion, the measurement weights are fixed except the relative importance parameters, $$Q_1 = Q_{t1} = \text{diag}(q_{t11}I_m, q_{t12}I_m, q_{t13}I_m). \quad (26)$$

The sensitivity function S(z) and control sensitivity function R(z) of the CD-MPC at steady-state (z=1) are:

$$S(1)=[I+G_{ss}\rho^{-1}(Q_{t3}+Q_{t4})^{-1}G_{sum}^T Q_{t1}]^{-1}, \quad (27)$$

$$R(1)=[\rho(Q_{t3}+Q_{t4})+G_{sum}^T Q_{t1} G_{ss}]^{-1} G_{sum}^T Q_{t1}, \quad (28)$$

where $G_{ss}$ is the scaled steady-state model, $G_{sum}$ is the matrix related to the prediction horizon and the process dynamics.

The spatial tuning goal is to find the smallest $\rho$ such that the robust stability condition in (20) is satisfied. First the range of $\rho \in (\rho_{low}, \rho_{high})$ such that the high limit $\rho_{high}$ is guaranteed to satisfy the robust stability condition is derived. This result in conservative performance and the automatic tuning procedure then uses a bisection searching method on $\rho$ in order to reduce conservativeness.

The most aggressive tuning number for $\rho$ is $\rho=0$. If $\rho \to +0$, then $S(1) \to 0$ but $\bar{\sigma}(R(1)) \to +\infty$ due to the fact that $G_{ss}$'s smallest singular value is almost zero. Thus the low limit of $\rho$ is $\rho_{low}=0$.

The most robust tuning is $\rho \to +\infty$. If $\rho \to +\infty$, $\bar{\sigma}(R) \to 0$. However, what is needed is for $\rho$ to be large enough for satisfying the robust stability condition (20). From (28), if let $$\rho > (1+\alpha)\bar{\sigma}((Q_{t3}+Q_{t4})^{-1})\bar{\sigma}(G_{sum})\bar{\sigma}(Q_{t1})\bar{\sigma}(G_{ss}), \quad (29)$$

then, $$\bar{\sigma}(R(1)) < \frac{1}{\alpha \bar{\sigma}(G_{ss})} \quad (30)$$

where $\alpha$ represents the degree of model uncertainty in (13). That means the robust stability condition in (20) is satisfied at steady-state. Note that the diagonal elements $q_{t3j}$ and $q_{t4j}$ with j=1 to 4 of $Q_{t3}$ and $Q_{t4}$ are positive numbers.

From (29), for all possible values of $Q_{t1}$, $Q_{t3}$, and $Q_{t4}$, the high limit of $\rho$ (which satisfies the robust stability condition in (20) at steady-state) is $$\rho_{high} = (1+\alpha)\bar{\sigma}(G_{sum})\bar{\sigma}(G_{ss}) \frac{\max(q_{t11}, q_{t12}, q_{t13})}{\min(q_{t31}, \cdots, q_{t34})}. \quad (31)$$

As mentioned in the previous section, as an RCM-block matrix, the singular values of the control sensitivity function R(1) in (28) can be calculated through $r(v_k, 1)$ which is similar as $g(v_k, z)$. For each spatial frequency, the most aggressive $\rho$ is searched from 0 to $\rho_{high}$ for satisfying the robust condition $$\bar{\sigma}(r(v_k, 1)) < \frac{1}{\alpha \bar{\sigma}(G_{ss})}, \forall v_k \quad (32)$$

The search method is a bisection method. This method will guarantee that $\rho$ is converged and further the robust stability condition is satisfied.

Figure 7A:
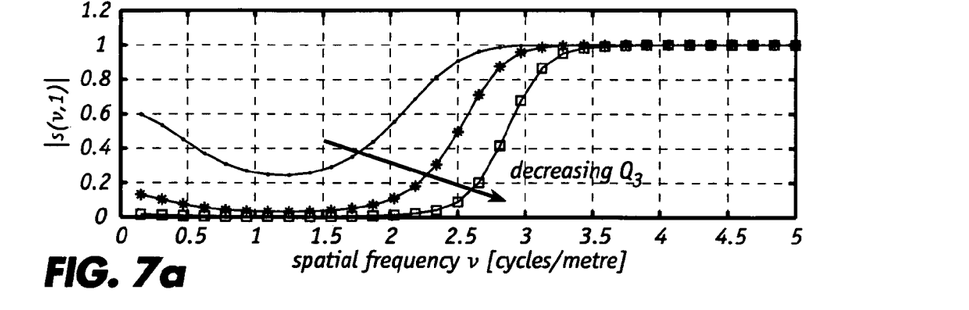
FIGS. 7(a) and 7(b) are graphs that depict sensitivity function (a) and control sensitivity function (b) in the spatial frequency domain (only one measurement and one actuator array are shown)
Figure 7B:
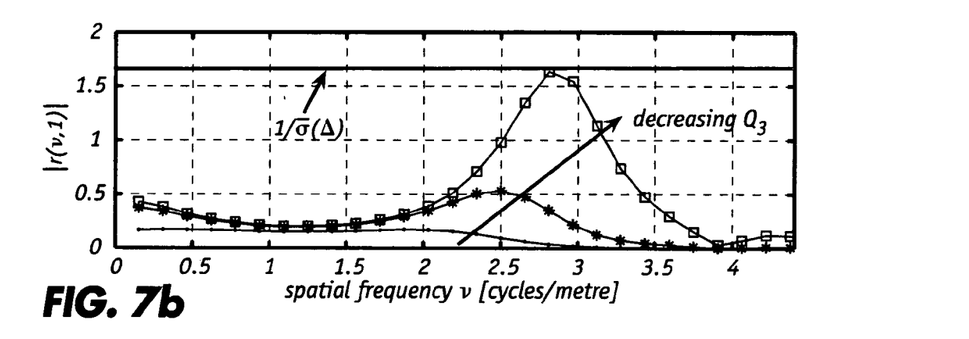

A simple example shown in FIG. 7 is to illustrate that decreasing $Q_3$ improves the spatial performance and reduces the robust stability margin. This example only shows a one-actuator-array and one-measurement-array case for clarity. Note that the maximum peak of spatial sensitivity function in FIG. 7a is 1 which is different from its temporal counterpart (see FIG. 8a). The reason is that the controller is non-casual in the spatial domain while the controller is casual in the temporal domain.

Temporal Tuning

After the spatial tuning procedure above, the spatial tuning parameters $Q_3$ and $Q_4$ are known. In this section, we will describe how to design the temporal tuning parameter $Q_2$, which is defined as $$Q_2 = \gamma \cdot Q_{t2} = \gamma \cdot \text{diag}(q_{t21} I_{n_1}, \ldots, q_{t24} I_{n_4}), \quad (33)$$

where $q_{t2j}$ with j=1 to 4 are the user-defined relative temporal aggressiveness tuning weights for 4 actuator arrays (the default values are 1), and $\gamma$ is the global temporal ratio parameter. The temporal tuning goal is to find a proper $\gamma$ such that the robust stability condition is satisfied in the face of the constraint on the maximum sensitivity. The range of $\gamma \in (\gamma_{low}, \gamma_{high})$ is first derived, and then search $\gamma$ in the range for satisfying the robust stability condition and the required closed-loop performance.

At spatial frequency $v=0$, the sensitivity function S(z) and control sensitivity function R(z) are $$s(v_0, Z) = [I_3 + g(v_0, z)k(v_0, z)]^{-1}, \quad (34)$$

$$r(v_0, z) = [I_4 + k(v_0, z)g(v_0, z)]^{-1} k(v_0, z), \quad (35)$$

where $g(v_0, z) \in C^{3 \times 4}$ and $k(v_0, z) \in C^{4 \times 3}$ are the plant model G(z) and the controller K(z) at spatial frequency $v_0=0$ respectively, $k(v_0, z)$ has the following structure, $$k(v_0, z) = [\gamma \Theta(z) + \Phi(z)]^{-1} \Psi(z), \quad (36)$$

where $\Theta(z)$, $\Phi(z)$, and $\Psi(z)$ are functions of the weights $q_{t2j}$, $q_{t3j}$, $q_{t1i}$, the prediction horizon $H_p$, and the plant model's temporal parameters.

The smallest (or most dynamically aggressive) value for $\gamma$ is $\gamma_{low}=0$ (that is $Q_2=0$). The largest (or most dynamically sluggish) value for $\gamma$ is $+\infty$. But we want to find a reasonable large value for $\gamma$ other than $+\infty$. This reasonable large value for $\gamma$ can drive the highest peak of the sensitivity function be $\eta_{low}$ (for example, $\eta_{low}=1.01$) and satisfy the robust stability condition. That is, we would like to let $\gamma = \gamma_{high}$ such that $$\|s(v_0, e^{i\omega}, \gamma)\|_{max} \leq \bar{\sigma}(s(v_0, e^{i\omega}, \gamma)) \leq \eta_{low}, \quad (37)$$

$$\bar{\sigma}(r(e^{i\omega}, \gamma)) < \frac{1}{\bar{\sigma}(\Delta(e^{i\omega}))}, \quad (38)$$

where $\|s\|_{max}$ denotes the maximum element of the matrix s.

Figure 8A:
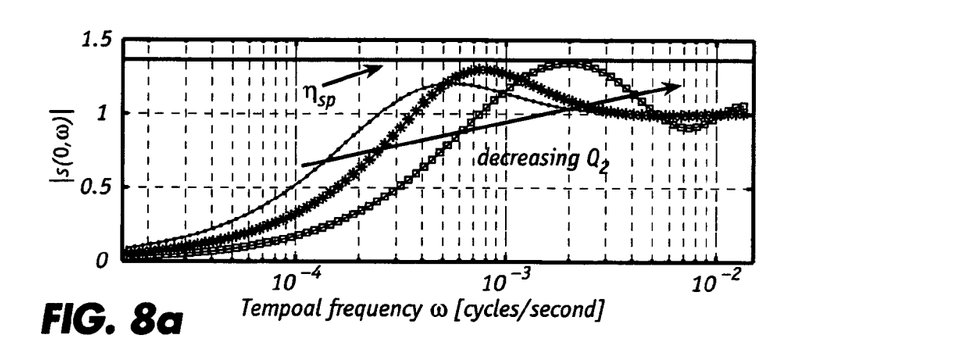
FIGS. 8(a) and 8(b) are graphs that depict sensitivity function (a) and control sensitivity function (b) in the temporal frequency domain (only one measurement and one actuator array are shown)
Figure 8B:
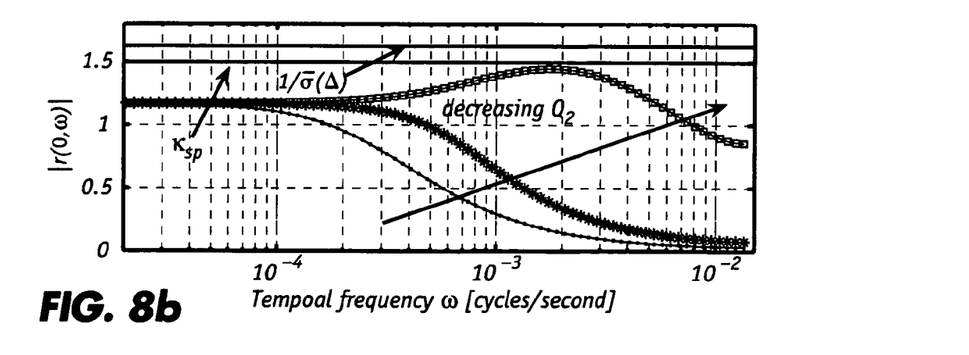

It is straightforward to obtain $\gamma_{high}$ from (37) and (38). After obtaining the range of $\gamma$, the target peaks are set up for the sensitivity function and the control sensitivity function (see $\eta_{sp}$, and $\kappa_{sp}$) in FIG. 8. Then a search of the global temporal ratio from $\gamma_{high}$ to 0 in order is done to reach the sensitivity function's target peak $\eta_{sp}$ without exceeding the control sensitivity function's peak $\kappa_{sp}$ and violating the robust stability condition in (38). If $\eta_{sp}$ cannot be reached by any $\gamma$, then the method endeavors to find $\gamma$ much that the control sensitivity function's peak is equal to $\kappa_{sp}$ without violating the robust stability condition in (38). During the search of the global temporal ratio $\gamma$, first use a smaller range $(\gamma_{high}, 0.1\gamma_{high})$ to replace the whole range $(\gamma_{high}, 0)$ and then a bisection method is used to search $\gamma$ and see whether the peaks are closed enough to their targets (say, ±1% of the targets). If a solution is found, then stop searching. Otherwise, move to the next smaller range and search again until one is found. The reason for this searching procedure is that it is preferred to find a relative bigger $\gamma$, that is, more robust controller, if it can satisfy the performance requirement, i.e., the maximum sensitivity function peak, and the robust stability condition.

FIG. 8 shows a simple example which illustrates the sensitivity function and control sensitivity function in the temporal frequency domain at the spatial frequency v=0. This example only shows the case for one controlled sheet property and one actuator array systems.

Example

Figure 9:
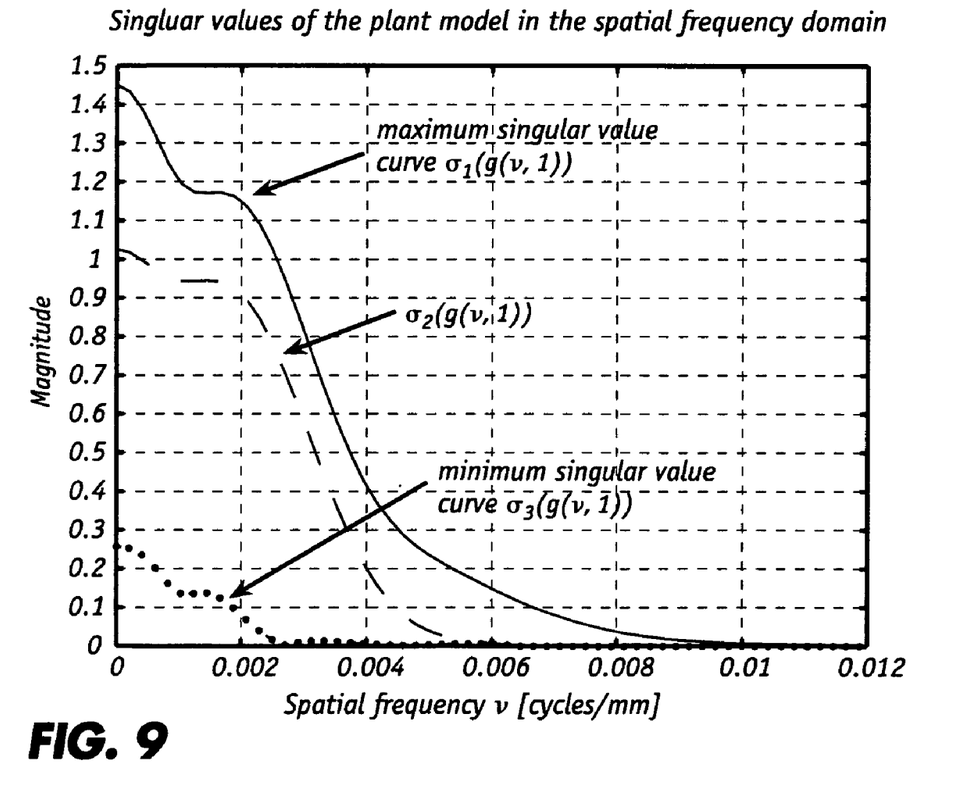
FIG. 9 is a graph of the singular values of the scaled steady-state model in the spatial frequency domain.
Figure 10A:
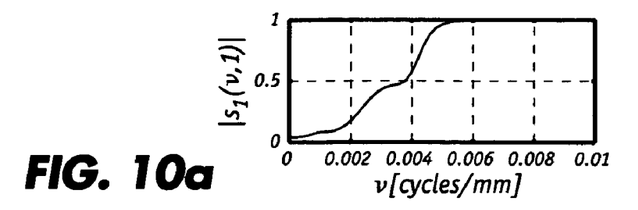
FIGS. 10(a)-(f) are graphs of the sensitivity function at steady-state in the spatial frequency domain ((a), (b), and (c)) and at zero spatial frequency in the temporal frequency domain ((d), (e), and (f))
Figure 10B:
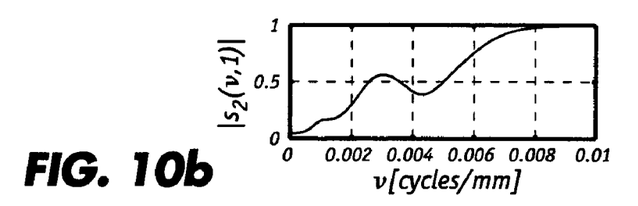
Figure 10C:
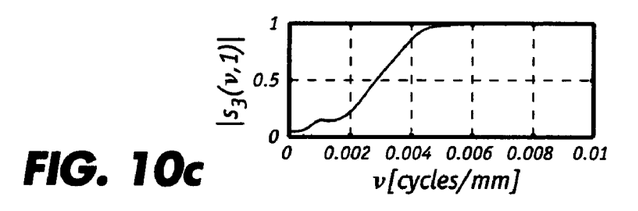
Figure 10D:
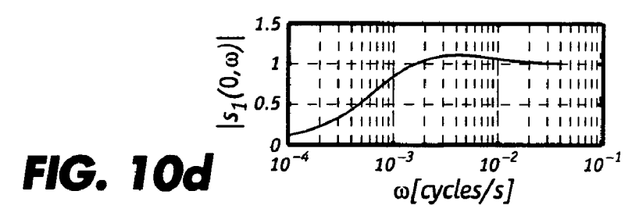
Figure 10E:
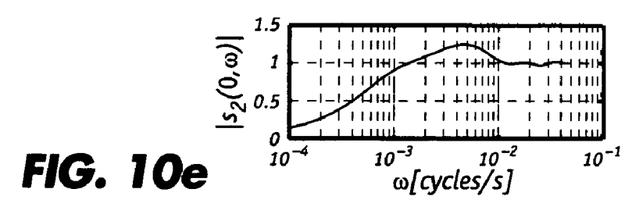
Figure 10F:
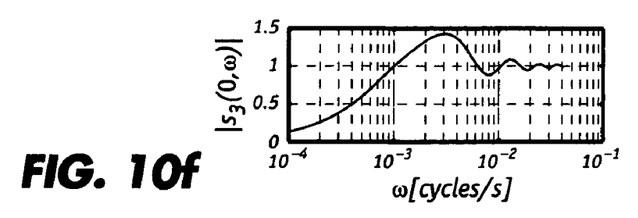

The CD process in a supercalender from a paper mill was used as the example which is difficult to be controlled by the traditional CD controller. FIG. 9 shows the singular values of the process model at steady-state in the spatial frequency domain. It is evident that the ill-conditioning of the process model is due to both the directionality of multiple actuator array and measurement arrays in the low spatial frequency range and low gains in the high spatial frequency range. After tuning, the sensitivity functions for each measurement at steady-state in the spatial frequency domain are shown in FIGS. 10a, b, and c while the sensitivity functions at zero spatial frequency in the temporal frequency domain are illustrated in FIGS. 10d, e, and f.

Figure 11A:
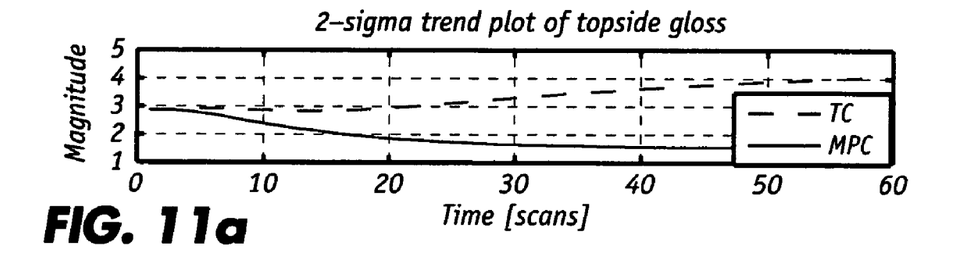
Figure 11B:
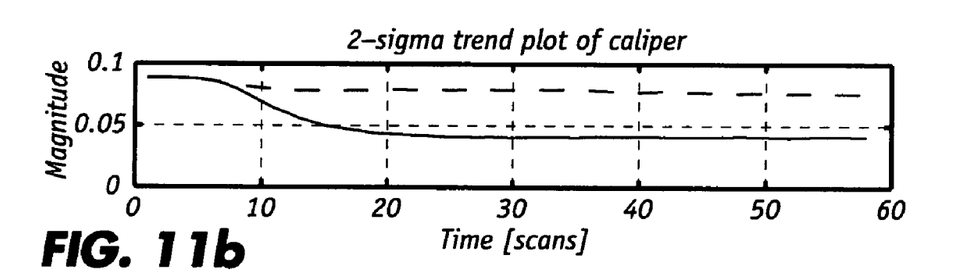
Figure 11C:
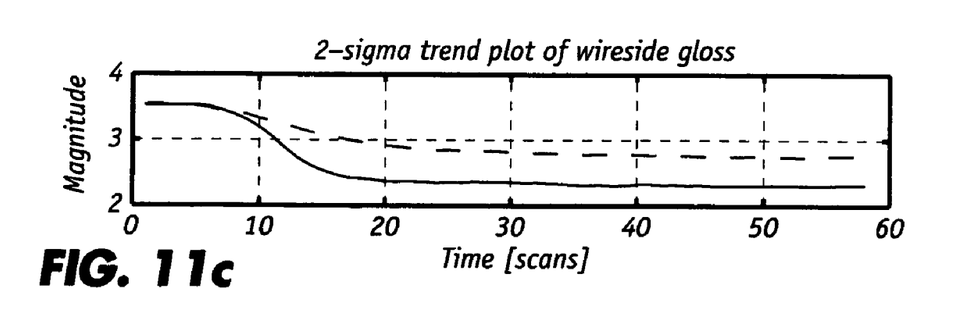

In industry, twice of the 2-norm of the error profile between the measurement profile and the target profile (2-sigma) is considered as the controller's spatial performance index. FIG. 11 shows the temporal performance by running the traditional controller (TC) and MPC in a hardware-in-loop simulator. For the traditional controller, the top and wire side steambox actuator arrays were used for controlling the top and wire side gloss respectively and the two induction heating actuator arrays were used for controlling the caliper profile. It is apparent that the temporal performance of the MPC controller is much better than the traditional one. The 2-sigma of the topside gloss becomes worse after using the traditional controller. The spatial performance of both controllers is summarized in Table 1. It is clear that the MPC controller's spatial performance is much better than the traditional controller's.

TABLE 1

|  | 2-sigma before control | 2-sigma after control (TC) | 2-sigma after control (MPC) |
|---|---|---|---|
| Top side gloss | 2.8711 | 4.0326 | 1.5450 |
| Caliper | 0.0882 | 0.0758 | 0.0408 |
| Wire side gloss | 3.5333 | 2.7613 | 2.3109 |

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of automatically tuning a multivariable model predictive controller (MPC) for a spatially-distributed process that comprises the steps of:
    (a) identifying a process model for the spatially-distributed process, that includes process measurements and actuations, which is part of a closed-loop MPC control system;
    (b) scaling inputs and outputs of the process model in the spatial frequency domain to yield a scaled process model by (i) transforming the process model into a series or matrix models or subplants, (ii) finding spatial controllable components for each subplants, (iii) averaging the subplants to yield an average model that represents the process model and (iv) finally, finding scaling input and output functions of the average model, wherein scaling comprises one input scaling number for each actuator array and one output scaling number for each measurement array to mitigate the effects of physical unit changes and changes in spatial resolution of process measurements and actuations and whereby sealing the inputs and outputs of the process model causes tuning parameters not to change with physical unit changes of measurement and actuation and causes tuning parameters not to change with resolution changes of measurement and actuation;
    (c) transforming the scaled process model into a two-dimensional frequency domain;
    (d) transforming the MPC into a two-dimensional frequency domain;
    (e) determining an optimal solution of the spatial tuning parameters with respect to model uncertainty which comprises first calculating possible ranges of the spatial tuning parameters for the MPC and then searching in the spatial frequency domain for stabilizing the closed-loop system due to model uncertainty and which satisfies a robust, stability condition in the spatial frequency domain;
    (f) determining an optimal solution of the temporal tuning parameters with respect to model uncertainty which comprises first calculating possible ranges of the temporal parameters for the MPC and then searching in the temporal frequency domain for stabilizing the closed-loop system due to model uncertainty and which satisfies a robust stability condition in the temporal frequency domain; and
    (g) repeating steps (e) and (f) in an iterative process until suitable spatial tuning parameters und temporal tuning parameters are determined such that the spatially-distributed process as part of a closed-loop MPC control system exhibits robust stability and whereby tuning is done automatically in the two-dimensional frequency domain, wherein the spatially-distributed process is a sheetmaking cross-directional (CD) process.

2. The method of claim 1 wherein step (a) comprises applying a bump test on the sheetmaking CD process.

3. The method of claim 1 wherein steps (c) and (d) each is a Fourier transform and a permutation.

4. The method of claim 1 wherein the spatially-distributed process is selected from one of a paper machine, an off-machine supercalender, on-machine supercalender, plastic sheetmaking, rubber sheetmaking, and sheet metal operation.

5. The method of claim 1 wherein step (e) comprises calculating tuning parameter values of at least one weighting matrix and prediction horizon in a quadratic function and step (f) comprises calculating optimal tuning parameter values of at least one weighting matrix and prediction horizon in a quadratic function.

6. The method of claim 1 wherein step (c) comprises searching a global spatial tuning parameter in the spatial frequency domain and step (f) comprises searching a global temporal tuning parameter in the temporal frequency domain.

7. The method of claim 1 wherein step (e) comprises searching the optimal spatial tuning weights through a spatial sensitivity function in the spatial frequency domain and step (f) comprises searching time optimal spatial tuning weights through a temporal sensitivity function and control sensitivity function in the temporal frequency domain.

8. The method of claim 1 wherein each of steps (e) and (f) employs either an unstructured model uncertainty or structured model uncertainty to satisfy the robust stability condition.

9. In a process control system having a multivariable model predictive controller (MPC) for providing control to a spatially-distributed multiple-array cross-directional (CD) process having at least one manipulated actuator array and at least one controlled measurement array, a method for providing control of the multiple-array CD process that comprises the steps of:
(a) automatically tuning the MPC by the steps of:
  (i) identifying a process model for the CD process, that includes process measurements and actuations, which is part of a closed-loop MPC control system;
  (ii) scaling inputs and outputs of the process model in the spatial frequency domain to yield a scaled process model transforming the process model into a series of matrix models or subplants, (ii) finding spatial controllable components for each subplant, (iii) averaging the subplants to yield an average model that represents the process model and (iv) finally, finding scaling input and output functions of the average model, wherein scaling comprises one input scaling number for each actuator array and one output scaling number for each measurement array to mitigate the effects of physical unit changes and changes in spatial resolution of process measurements and actuations and whereby scaling the inputs and outputs of the process model causes tuning parameters not to change with physical unit changes of measurement and actuation and causes tuning parameters not to change with resolution changes of measurement and actuation;
  (iii) transforming the scaled process model into the two-dimensional frequency domain;
  (iv) transforming the MPC into the two-dimensional frequency domain;
  (v) calculating possible ranges of spatial and temporal tuning parameters rot the MPC;
  (vi) determining an optimal solution of spatial tuning parameters with respect to model uncertainty which comprises first calculating parameter ranges and then searching in the spatial frequency domain for stabilizing the closed-loop system due to model uncertainty and which satisfies a robust stability condition in the spatial frequency domain;
  (vii) determining an optimal solution of temporal tuning parameters with respect m model uncertainty which comprises first calculating parameter ranges and then searching in the temporal frequency domain for stabilizing the closed-loop system due to model uncertainty and which satisfies a robust stability condition in the temporal frequency domain; and
  (viii) repeating steps (vi) and (vii) in an iterative process until suitable spatial tuning parameters and temporal tuning parameters are determined such that the spatially-distributed multiple-array CD process as part of a closed-loop MPC control system exhibits robust stability and whereby the automatic tuning is done in the two-dimensional frequency domain; and
(b) inputting optimal tuning parameters to the MPC; and
(c) controlling the multiple-array CD process with the MPC, wherein the spatially-distributed process is a sheetmaking cross-directional (CD) process.

10. The process of claim 9 wherein step (i) in step (a) comprises applying a bump test on a sheetmaking CD process.

11. The process of claim 9 wherein the spatially-distributed process is a paper machine or an off-machine supercalender.

12. The process of claim 9 wherein step (ii) in step (a) comprises using a low spatial frequency approximation of the process model of the process to scale the process model.

13. The process of claim 9 wherein step (vi) in step (a) comprises calculating tuning parameter values of at least one weighting matrix and prediction horizon in a quadratic function and step (vii) in step (a) comprises calculating optimal tuning parameter values of weighting matrix and prediction horizon in a quadratic function.

14. Abe process of claim 9 wherein steps (iii) and (iv) in step (a) each is a Fourier transform and a permutation.

15. A system which forms a material in a spatially-distributed multivariable-array cross-directional process wherein the system comprises:
at least two sets of actuator arrays each distributed adjacent the material in the cross direction (CD), wherein each set of actuator arrays is controllable to vary the properties of the material;
means for measuring and acquiring properties data about the properties of the material in the cross direction; and
a multivariable model predictive controller (MPC) for providing CD control to the multiple-array cross-directional process, wherein the MPC includes means for automatically tuning the MPC, wherein the MPC, in response to signals that are indicative of the properties data, provides signals to the at least two sets of actuator arrays to vary properties of the material and wherein the means for automatically tuning the MPC comprises:
(a) means for identifying a process model for the C I-) process, that includes process measurements and actuations;
(b) means for scaling inputs and outputs of the process model in the spatial frequency domain to yield a scaled process model by (i) transforming the process model into a series or matrix models or subplants, (ii) finding spatial controllable components for each subplant, (iii) averaging the subplants to yield an average model that represents the process model and (iv) finally, finding scaling input and output functions of the average model, wherein scaling comprises one input scaling number for each actuator array and one output scaling number for each measurement array to mitigate the effects of physical unit changes and changes in spatial resolution of process measurements and actuations and the means for scaling the inputs and outputs of the process model causes tuning parameters not to change with physical unit changes of measurement and actuation and causes tuning parameters not to change with resolution changes of measurement and actuation;
(c) means for transforming the scaled process model into the two-dimensional frequency domain;
(d) means for transforming the MPC into the two-dimensional frequency domain;
(e) means for calculating possible ranges of spatial and temporal tuning parameters for the MPC;
(f) means for determining an optimal solution of spatial tuning parameters with respect to model uncertainty by first calculating parameter ranges and then searching in the spatial frequency domain for stabilizing the closed-loop system due to model uncertainty and which satisfies a robust stability condition in the spatial frequency domain; and
(g) means for determining an optimal solution of temporal tuning parameters with respect to model uncertainty by first calculating parameter ranges and then searching in the temporal frequency domain for stabilizing the closed-loop system due to model uncertainty and which satisfies a robust stability condition in the temporal frequency domain, wherein the means for determining the optimal solution of spatial tuning parameters and the means for determining the optimal solution of temporal tuning parameters operate repeatedly in an iterative process until suitable spatial tuning parameters and temporal tuning parameters are determined such that the spatially-distributed multivariable-array cross-directional process as part of a closed-loop MPC control system exhibits robust stability and whereby tuning of the MPC is done automatically in the two-dimensional frequency domain, wherein the spatially-distributed process is a sheetmaking cross-directional (CD) process.

16. The system of claim 15 wherein the material is paper and each of the at least two sets of actuator arrays comprises a source of energy along the CD in a supercalender.

17. The system of claim 15 wherein the material is paper that is formed from wet stock in a papermaking machine.

18. The system of claim 15 wherein the means for measuring and acquiring properties data comprises a scanner that traverses adjacent the material in the cross direction.

* * * * *